Sept. 14, 1965    J. S. SENKEWITZ    3,205,575
FROZEN FOOD KNIFE
Filed Dec. 23, 1963
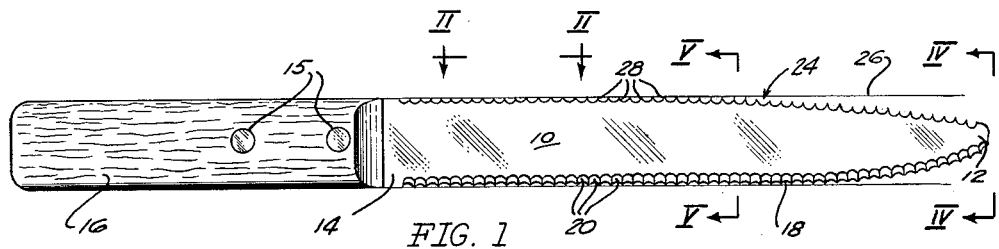
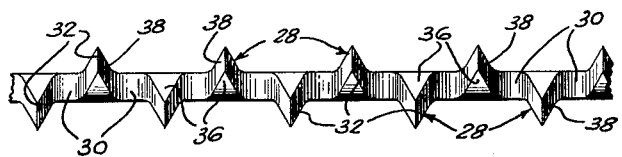
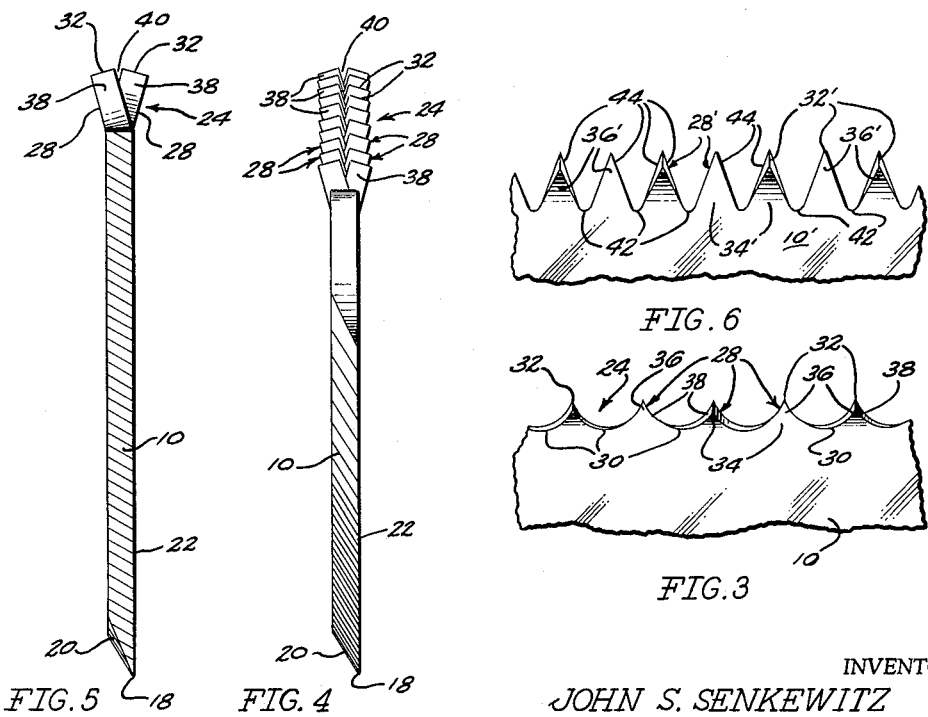
INVENTOR
JOHN S. SENKEWITZ
BY Beaman Beaman
ATTORNEYS United States Patent Office 3,205,575
Patented Sept. 14, 1965

3,205,575
FROZEN FOOD KNIFE
John S. Senkewitz, Brooklyn, Mich., assignor to S & S Industrial Products, Inc., Brooklyn, Mich., a corporation of Michigan
Filed Dec. 23, 1963, Ser. No. 332,395
3 Claims. (Cl. 30—355)

The invention pertains to a knife, and particularly relates to a knife adapted for use with frozen food.

It is often desired to cut frozen foods, meats, vegetables, etc., while the food is still in the frozen state. The ability to cut a small portion of frozen food from a larger portion, without defrosting the larger portion, is often desired to prevent the necessity of thawing the larger food portion. However, conventional knives using ordinary sharpened edges are not suitable for cutting frozen food. Knives using conventional serrated, sharpened edges or ridged sharpened edges also do not satisfactorily sever frozen foods. One of the basic problems encountered in severing frozen foods with conventional knife blade constructions arises from the tendency of the food to freeze or otherwise stick to the knife blade as it penetrates the food. Such freezing between the blade and food makes movement of the blade through the food very difficult, if not impossible.

It is, therefore, an object of the invention to provide a knife which is capable of cutting frozen food wherein the knife blade readily passes through the frozen food with little effort.

Another object of the invention is to provide a knife for use with frozen food wherein the knife employs teeth of such a construction as to prevent the food from sticking to the knife blade is the knife passes through the food.

As one of the basic problems encountered with knives having conventional serrated teeth when cutting frozen food lies in the fact that the teeth become clogged with the food, another object of the invention is to provide a knife capable of cutting frozen food, wherein the knife employes cutting teeth which are self-cleaning and do not become clogged with food particles during the cutting operation.

An additional object of the invention is to provide a knife capable of cutting frozen food with a minimum of effort wherein the knife cutting edge includes a plurality of cutting teeth evenly spaced on the knife edge and the knife edge is of a convex configuration of varying degrees of convexity, whereby the convex configuration of the knife edge aids in minimizing the effort required during the cutting operation.

These and other objects of the invention arising from the details and relationships of the components of embodiments thereof will be apparent from the following description and accompanying drawings wherein:

FIG. 1 is an elevational view of a knife employing a conventional serrated, lower cutting edge, and an upper cutting edge for frozen food constructed in accord with the invention, FIG. 2 is a plan enlarged, detail view of the novel cutting edge of the invention as taken along section II—II of FIG. 1, FIG. 3 is an enlarged, detail, elevational view of the knife cutting edge of FIGS. 1 and 2, FIG. 4 is an end elevational view of the knife blade of FIG. 1 as taken along section IV—IV thereof, FIG. 5 is an elevational, sectional view of the knife blade of FIG. 1 taken along section V—V thereof, and FIG. 6 is an enlarged, detail, elevational view of another embodiment of a knife cutting edge employing concepts of the invention.

FIG. 1 illustrates a preferred construction of a knife embodying the concepts of the invention. The knife consists of a generally planar blade 10 having a tip 12 and a handle portion 14. Rivets 15 may be used to mount the handle 16 on the handle portion 14 in any conventional manner. The blade 10 includes an edge 18 of a conventional serrated, sharpened construction wherein the knife may be used for cutting nonfrozen foods. The serrated teeth on the edge 18 are formed by grinding as at 20 to form a sharp edge with the blade side 22, FIGS. 4 and 5.

The novel frozen food cutting teeth of the invention are formed on the blade edge 24. The edge 24 extends substantially from the blade handle portion 14 to the tip portion 12 and is of a convex configuration, as will be appreciated by comparison of the edge 24 with the straight reference line 26, FIG. 1. The portion of knife edge 24 extending from the handle portion 14 to approximately one-half the distance to the tip 12 is only slightly convex, as will be appreciated with reference to line 26. The portion of knife edge 24 extending from the tip 12 to approximately one-half the distance to the handle portion 14 is of a much more pronounced convex form, whereby the distance from the upper edge of the tip 12, FIG. 1, to the line 26 immediately thereabove, is approximately one-third the height of the blade. The purpose of the convex configuration of the knife edge 24 will be described later.

The knife edge 24 is provided with a plurality of teeth 28 capable of readily cutting frozen foods. The preferred construction of the teeth 28 will be apparent from FIGS. 1 through 5. The teeth 28 are formed by a plurality of evenly spaced, concave notches 30 defined in the blade edge. The concave notches 30 are of such depth and configuration that adjacent notches intersect to form a pointed tooth apex 32. The notches 30 define concave valleys between the teeth 28 and thereby also define the base portions 34 of the teeth. The tooth portion 36 between the base portion 34 and the apex 32 is hereinafter referred to as the tooth terminating cutting portion. The faces 38 of the teeth 28 are substantially perpendicularly disposed to the sides of the blade 10 and define sharp right angle intersections therewith. As will be apparent from FIGS. 4 and 5, the apexes of the teeth are of a lateral width equal to that of the teeth, and the width of the teeth is substantially equal to that of the width of the blade 10 adjacent the edge 24 in which the teeth are formed.

Alternate teeth 28 are offset from the general plane of the blade 10 in opposite directions thereto. It is a feature of the invention that the amount of offset of the teeth 28 from the general plane of the blade be sufficient to cause the teeth to remove enough food from the knife incision to produce an incision of a width substantially greater than that of the blade. Thus, the frozen food will not "freeze" to the knife blade, or otherwise stick thereto, as the blade passes through the food. As will be apparent from FIGS. 2 through 5, the amount of offset of the terminating cutting portions 36 of the teeth 28, particularly adjacent the apexes 32, amounts to at least one-half of the width of the knife blade adjacent the teeth 28, and the amount of the offset at the apexes may substantially approach a distance equal to the width of the blade adjacent the teeth.

When using the knife to cut frozen food, the blade 10 will, of course, be reversed from the position shown in FIG. 1 wherein the blade edge 24 will become the lower knife blade edge. The blade is reciprocated across the frozen food in the conventional manner to produce the cut. As the teeth 28 engage the frozen food, the teeth will remove particles of the food due to the cutting action occurring between the teeth faces 38 and the apexes and sides of the blade. As will be apparent from FIGS. 4 and 5, the offset of the teeth 28 produce a "V-groove" 40 in the longitudinal direction of the blade edge, whereby both lateral edges of the teeth will cut and remove food from the knife incision. The previously described convex configuration of the knife edge 24 minimizes the effort required during the cutting action, as only a limited portion of the frozen food will be in direct engagement with the teeth 28 at any instant during the cutting action.

As the faces 38 of the teeth 28 are of an arcuate configuration, as defined by the notches 30, and the valleys between the teeth are "open" due to the concave configuration, there is no tendency for the frozen food particles removed by the teeth to clog the teeth and, thus, the teeth are "self-cleaning."

A variation of the invention is shown in FIG. 6, wherein components similar to those previously described are indicated by primes. In FIG. 6 the teeth 28' are defined by a plurality of substantially V-shaped notches 42 wherein the teeth will be formed with planar faces 44. The teeth 28' include a base portion 34' and a terminating cutting portion 36' adjacent the apexes 32'. As in the embodiment of FIGS. 1 through 5, the teeth 28' of FIG. 6 are alternately offset in opposite directions relative to the general plane of the blade 10' to a comparable degree, as previously described. The embodiment of FIGS. 1 through 5 is preferred in that the tooth configuration of FIG. 6 is not capable of cleaning itself to the extent of the preferred tooth embodiment. However, it will be appreciated that the other aspects of the novel knife tooth construction are utilized in this embodiment.

It is to be understood that various modifications, other than those disclosed, may be apparent to those skilled in the art without departing from the spirit and scope thereof, and it is intended that the invention be defined only by the following claims.

I claim:
1. A knife particularly adapted for use with frozen food comprising, in combination,
 (a) a generally planar blade having an edge,
 (b) a plurality of evenly spaced teeth defined on said blade edge, said teeth each including a base portion and a terminating cutting portion, said teeth including a linear apex edge defined on said cutting portion substantially perpendicular to the associated offset terminating cutting portion,
 (c) the terminating cutting portion of alternate teeth being laterally offset in opposite directions with respect to the general plane of said blade.
2. A knife particularly adapted for use with frozen food comprising, in combination,
 (a) a generally planar blade having an edge, said blade being of a given thickness adjacent said edge,
 (b) a plurality of evenly spaced teeth defined on said blade edge having a thickness substantially corresponding to that of said blade adjacent said edge, said teeth each including a base portion and a terminating cutting portion, said teeth including a linear apex edge defined on said cutting portion substantially perpendicular to the associated offset terminating cutting portion,
 (c) the terminating cutting portion of alternate teeth being offset in opposite directions with respect to the general plane of said blade a distance equal to at least one-half of the thickness of said teeth.
3. A knife particularly adapted for use with frozen food comprising, in combination,
 (a) a generally planar blade having a tip and a handle portion,
 (b) an edge defined on said blade extending from said handle portion to said tip, said edge being slightly convex from said handle portion to approximately one-half the distance to said tip, said edge being significantly convex from said tip to approximately one-half the distance to said handle portion, said blade having a given thickness adjacent said edge,
 (c) a plurality of evenly spaced notches defined in said blade edge having a defining surface substantially perpendicularly disposed to the plane of said blade, adjacent notches intersecting and defining evenly spaced teeth having sharp linear apexes and terminating cutting portions, said apexes being substantially perpendicular to the associated offset terminating cutting portion
 (d) the apexes and terminating cutting portions of alternate teeth being offset in opposite directions with respect to the general plane of said blade a distance equal to at least one-half of the thickness of said teeth.

References Cited by the Examiner

UNITED STATES PATENTS

| 277,021 | 5/83 | Gabus | 143—133 |
| 1,494,576 | 5/24 | Biedermann et al. | 143—133 |
| 2,351,737 | 6/44 | Blum | 143—133 |
| 2,685,734 | 8/54 | Klein | 30—355 X |
| 2,750,669 | 6/56 | Hohmann | 30—355 |

FOREIGN PATENTS

| 695,366 | 8/53 | Great Britain. |

WILLIAM FELDMAN, *Primary Examiner.*

MILTON S. MEHR, *Examiner.*